UNITED STATES PATENT OFFICE.

HENRY D. HIBBARD, OF PLAINFIELD, NEW JERSEY.

METHOD OF MAKING MANGANESE STEEL.

954,185.  Specification of Letters Patent.  Patented Apr. 5, 1910.

No Drawing.   Application filed April 17, 1909.   Serial No. 490,553.

*To all whom it may concern:*

Be it known that I, HENRY D. HIBBARD, a citizen of the United States, residing in Plainfield, in the county of Union and State of New Jersey, have invented certain new and useful Improvements in Methods of Making Manganese Steel, of which the following is a specification.

The present improvement relates to the manufacture of manganese steel, and particularly to the manufacture of such steel from manganese steel scrap, the object of the invention being to provide an improved method of saving and utilizing metallic manganese existing in manganese steel scrap and to make from such scrap new manganese steel without great loss of manganese.

The usual methods followed in re-working manganese steel scrap all involve the oxidation and waste of practically all the manganese contained in the scrap, this being relatively much more valuable than the iron in the scrap. If a considerable part of the metallic manganese in the scrap is oxidized, and thereby wasted, then practically all must be so that the carbon may also be eliminated, as otherwise the resulting steel would contain too much carbon because carbon cannot be eliminated from molten iron if it contains much manganese.

The gist of the present improvement therefore consists in melting the manganese steel scrap in a substantially non-oxidizing environment, such as may be maintained in an electric furnace of certain types. This procedure will prevent any great loss of manganese. By using the electric furnace the substantially non-oxidizing environment is maintained by reason of the fact that the melting of the steel is not the result of heat obtained by the combustion of fuel with the oxygen of the air. In a furnace in which the latter mode of procedure is followed, there must be introduced, in order to secure good combustion, an excess of air, and the result is that the flame is oxidizing and will oxidize the charge in the furnace. For instance, in a pneumatic converter the air-blast first burns out and so wastes practically all the manganese of the charge, and in a crucible the heat is generated outside of the crucible containing the charge, such heat being slowly conducted through the walls of the crucible to the charge, whereas in the electric furnace of a suitable type the heat is generated in the metal or slag, that is, in the charge itself.

In carrying out this improved process of manufacturing manganese steel from manganese steel scrap, I usually melt some ordinary steel scrap with the manganese steel scrap, and at the completion of the fusion add to the molten metal ferromanganese in sufficient quantity to convert the ordinary steel scrap into manganese steel and to make up any loss of manganese which may have occurred during the melting. Some suitable electric furnace may be used in which the charge may be protected while melting from free access of air, the oxygen of the air being the principal agent which wastes by oxidation the manganese in the charge in other processes for re-working manganese steel scrap. Only such materials as are low in carbon may be used as a part of the charge in this process. For instance, pig iron may not be used, as it contains too much carbon for the purpose, and therefore I prefer ordinary steel scrap containing less than five tenths per cent. of carbon. An environment free from carbon is also required, as otherwise carbon would be absorbed by the metallic iron of the charge and, as just stated, such carbon cannot be eliminated from the charge and the content of carbon cannot then be controlled, so that the amount of that element in the steel would be too great. It is only necessary that the molten metal of the charge be not in actual contact with carbon to give the environment free from carbon. Thus carbon electrodes which contact with the slag of the charge but not with the metal thereof are permissible and, in some types of furnaces, desirable. Obviously therefore, this requirement precludes the use of the crucible process for my purpose, as the crucibles contain carbon which the metal would absorb. Not only this, but in the crucible process the quantity of steel made in one crucible is small,—not over 80 pounds,—while in the electric furnace the charge may weigh many tons. The capacity of the crucible practically cannot be increased because of the lack of strength, and if made stronger and thicker the difficulty of heating the charge through the crucible, as explained, would be correspondingly increased. Furthermore, the crucibles have to be removed bodily with their charges from the furnace, while the charge of the electric furnace may be tapped or poured from the place where it is melted, the furnace body sometimes being adapted to pour out the charge by tilting, rolling, or a similar motion. Thus by the present process there is a material saving both in fuel and power, as well as dispensing with the cost of crucibles.

In carrying out this process the ordinary steel may be melted separately from the manganese steel, but they must be mixed together before casting. In melting I keep the charge covered as completely as possible with a slag containing as little free oxid of iron as can be maintained, as such oxid if present will oxidize the metallic manganese of the charge. This slag I make up chiefly of lime with a little silica and may add the usual fluxing and purifying ingredients used in other steel slags. The slag will also contain any non-gaseous products derived from the materials of the charge. In order to hasten the process I preheat the scrap steel before charging it into the electric furnace. This I do in any of the usual heating furnaces suitable to the purpose, wherein the heat is derived from the combustion of fuel, but of such a character that the oxidizing effect is kept as small as practicable with that type of furnace. The scrap must not be preheated to above a low red heat, for if it be heated to a higher degree its surface will be unduly oxidized, with a resultant loss of iron, and more particularly of manganese, in the charge.

I claim as my invention:

1. The method of utilizing the manganese in manganese steel scrap which consists in melting such scrap under substantially non-oxidizing conditions in an electric furnace.

2. The method of utilizing the manganese in manganese steel scrap which consists in melting such scrap under substantially non-oxidizing conditions in an electric melting furnace, and then adding a manganese alloy to replace the manganese oxidized during the operation.

3. The method of utilizing the manganese in manganese steel scrap which consists in melting it together with or separately from some ordinary steel scrap under substantially non-oxidizing conditions in an electric melting furnace, and then adding to the molten metal sufficient manganese alloy to replace the manganese lost from the charge.

4. The method of making manganese steel from a charge consisting in part of manganese steel scrap and in part of ordinary steel which consists in melting the charge under conditions neither strongly oxidizing nor strongly carbonizing, such as may be established and maintained in a suitable electric furnace, whereby the loss of manganese is kept at a minimum.

5. The method of making manganese steel from a charge consisting in part of manganese steel scrap and in part of ordinary steel, which consists in melting the charge under conditions neither strongly oxidizing nor strongly carbonizing, such as may be established and maintained in a suitable electric furnace, whereby the loss of manganese is kept at a minimum, and merging with such molten manganese steel ordinary steel previously melted and then adding sufficient ferromanganese or equivalent metallic manganese to give the whole the desired percentage of manganese.

6. The method of utilizing the manganese in manganese steel scrap which consists in melting such scrap in an electric melting furnace and protecting the same by a non-oxidizing slag.

7. The method of utilizing the manganese contained in manganese steel scrap which consists in melting such scrap in an electric furnace free from contact with carbon while in its molten state.

8. The method of utilizing the manganese contained in manganese steel scrap which consists in melting such scrap in an electric furnace free from contact with carbon while in its molten state and while protected from free access of air.

9. The method of making manganese steel from manganese steel scrap which consists in preheating the scrap steel and then melting it in a substantially non-oxidizing environment.

10. The method of making manganese steel from manganese steel scrap which consists in preheating the scrap steel and then melting it in a substantially non-oxidizing environment in an electric melting furnace.

11. The method of making manganese steel from manganese steel scrap which consists in preheating the scrap steel and then melting it in a substantially non-oxidizing environment in an electric melting furnace, and then adding a manganese alloy to replace the manganese oxidized during the operation.

12. The method of making manganese steel from manganese steel scrap which consists in preheating the scrap steel to a point not above a low red heat and then melting it in a substantially non-oxidizing environment.

13. The method of making manganese steel from manganese steel scrap which consists in preheating the scrap steel to a point not above a low red heat and then melting it in a substantially non-oxidizing environment in an electric melting furnace.

14. The method of making manganese steel from manganese steel scrap which consists in preheating the scrap steel to a point not above a low red heat and then melting it in a substantially non-oxidizing environment in an electric melting furnace, and then adding a manganese alloy to replace the manganese oxidized during the operation.

15. The method of making manganese steel from manganese steel scrap which consists in preheating the scrap steel and then melting it in a substantially non-oxidizing environment and while covered by a substantially non-oxidizing slag.

16. The method of making manganese steel from manganese steel scrap which consists in preheating the scrap steel and then melting it in a substantially non-oxidizing environment in an electric melting furnace and covering the molten metal by a substantially non-oxidizing slag.

17. The method of making manganese steel from manganese steel scrap which consists in preheating the scrap steel and then melting it in a substantially non-oxidizing environment in an electric melting furnace, then covering the molten metal by a substantially non-oxidizing slag, and then adding a manganese alloy to replace the manganese oxidized during the operation.

18. The method of making manganese steel from manganese steel scrap which consists in preheating the scrap steel to a point not above a low red heat and then melting it in a substantially non-oxidizing environment while protected by a substantially non-oxidizing slag.

19. The method of making manganese steel from manganese steel scrap which consists in preheating the scrap steel to a point not above a low red heat and then melting it in a substantially non-oxidizing environment in an electric melting furnace while protecting it by a substantially non-oxidizing slag.

20. The method of making manganese steel from manganese steel scrap which consists in preheating the scrap steel to a point not above a low red heat and then melting it in a substantially non-oxidizing environment in an electric melting furnace and while protected by a substantially non-oxidizing slag, and then adding a manganese alloy to replace the manganese oxidized during the operation.

21. The method of utilizing the manganese in manganese steel scrap which consists in preheating it to a point not above a low red heat and then melting it together with or separately from ordinary steel scrap under substantially non-oxidizing conditions in an electric melting furnace and while protected by a substantially non-oxidizing slag, and then adding to the molten metal sufficient suitable manganese alloy to replace the manganese lost from the charge.

22. The method of utilizing the manganese in manganese steel scrap which consists in preheating it to a point not above a low red heat and then melting it together with or separately from ordinary steel scrap in an electric melting furnace under conditions neither strongly oxidizing nor strongly carbonizing whereby the loss of manganese is kept at a minimum and while protected by a substantially non-oxidizing slag, and then adding to the molten metal sufficient suitable manganese alloy to replace the manganese lost from the charge.

23. The method of utilizing the manganese in manganese steel scrap which consists in melting such scrap under substantially non-oxidizing conditions by the generation of the heat within the charge.

24. The method of utilizing the manganese in manganese steel scrap which consists in melting such scrap under substantially non-oxidizing conditions in an electric melting furnace in which the heat is generated within the charge.

25. The method of making manganese steel from manganese steel scrap which consists in preheating the scrap steel and then melting it in a substantially non-oxidizing environment in an electric melting furnace in which the heat is generated within the charge, and then adding a manganese alloy to replace the manganese oxidized during the operation.

Signed at 9 to 15 Murray street, New York, N. Y., this 13th day of April, 1909.

HENRY D. HIBBARD.

Witnesses:
C. A. WEED,
F. E. BOYCE.